United States Patent [19]

Tsai

[11] Patent Number: 4,675,041
[45] Date of Patent: Jun. 23, 1987

[54] METHOD AND APPARATUS FOR FURNACE LID PURGING

[75] Inventor: Yih-Wan Tsai, Pittsburgh, Pa.

[73] Assignee: PPG Industries, Inc., Pittsburgh, Pa.

[21] Appl. No.: 811,137

[22] Filed: Dec. 19, 1985

[51] Int. Cl.⁴ .............................................. C03B 5/16
[52] U.S. Cl. .......................................... 65/27; 65/135;
65/136; 65/337; 65/335; 65/347; 65/356;
432/189; 432/196
[58] Field of Search ................... 65/27, 337, 135, 335,
65/136, 347, 356; 432/189, 196

[56] References Cited

U.S. PATENT DOCUMENTS

| 3,165,301 | 1/1965 | Riviere | 263/15 |
| 3,617,234 | 11/1971 | Hawkins | 65/135 |
| 3,734,701 | 5/1973 | Pecoraro et al. | 65/27 |
| 3,837,832 | 9/1974 | Pecoraro et al. | 65/182 |
| 4,294,603 | 10/1981 | Winzer | 65/356 X |
| 4,375,236 | 3/1983 | Tsai | 165/1 |
| 4,381,934 | 5/1983 | Kunkle et al. | 65/135 |
| 4,496,315 | 1/1985 | Savolskis | 432/30 |
| 4,496,316 | 1/1985 | Tsai | 432/30 |
| 4,496,387 | 1/1985 | Heithoff et al. | 65/335 |
| 4,506,726 | 3/1985 | Tsai | 165/1 |
| 4,519,814 | 5/1985 | Demarest, Jr. | 65/27 |

Primary Examiner—Arthur Kellogg
Attorney, Agent, or Firm—Andrew C. Siminerio

[57] ABSTRACT

In a heating vessel wherein corrosive exhaust degrades exposed positions of the vessel, a high velocity gas jet injects gas between the corrosive exhaust and the exposed portions of the vessel. The gas minimizes contact between the exhaust and the exposed portions so as to reduce wear due to corrosive degradation.

17 Claims, 4 Drawing Figures

METHOD AND APPARATUS FOR FURNACE LID PURGING

BACKGROUND OF THE INVENTION

1. Field of the Invention

This invention relates to high temperature heating vessels and, in particular, to reducing the degradation of a heating vessel lid in a glass melting furnace due to hot corrosive material reacting with the lid material.

2a. Technical Considerations

Continuous glass melting processes conventionally entail depositing pulverulent batch materials into a pool of molten glass maintained within a tank-type melting furnace and applying thermal energy until the materials are melted into the pool of molten glass. A melting tank conventionally contains a relatively large volume of molten glass so as to provide sufficient residence time for currents in the molten glass to affect some degree of homogenization before the glass is discharged to a forming operation. These recirculating flows in a tank-type melter may result in inefficient use of thermal energy. Conventional overhead radiant heating is inefficient in that only a portion of its radiant energy is directed downward towards the material being melted. Furthermore, attempting to heat a relatively deep recirculating mass of glass from above inherently produces thermal inhomogeneities which may carry over into the forming process and possibly affect the quality of the glass products being produced.

As an alternative to conventional tank-type glass melting furnaces, as described above, U.S. Pat. No. 4,381,934 to Kunkle and Matesa discloses an intensified batch liquefaction process in which large volumes of batch are efficiently liquefied in a relatively small liquefaction vessel. This type of process, particularly when using intensified heat sources, produces relatively small volumes of high temperature exhaust gas. Heat from this exhaust gas can be recovered and used to directly heat a batch stream feeding the liquefaction vessel so as to improve the overall efficiency of the process.

It is believed that during the batch melting process, certain components of the batch material may become vaporized and may combine with the exhaust stream along with any particulate matter that may become entrained in the exhaust. In the high heat environment of the liquefaction vessel as disclosed in U.S. Pat. No. 4,381,934, these vapors and particulates are highly corrosive. As the hot exhaust gas is removed from the top of the vessel, exhaust gas flow patterns may become established that tend to recirculate the corrosive gas in the vicinity of the lid of the vessel. These materials may corrode with the lid material causing degradation of the inner surface of the lid, leading to accelerated wear and premature replacement of the lid.

It would be desirable to control the circulation of the exhaust gas to keep it away from the lid so as to reduce lid degradation and increase lid life.

2b. Patents of Interest

U.S. Pat. Nos. 4,375,236 and 4,506,726 to Tsai teach the use of air jets to redistribute the combustion air and/or exhaust gas flow in a regenerative furnace for melting glass. Air jets positioned in the regenerators modify gas flow so that gas passing through the packing is evenly distributed throughout the packing to prevent localized overheating.

U.S. Pat. No. 4,496,315 to Savolskis and U.S. Pat. No. 4,496,316 to Tsai teach the use of air jets for controlling the flow of air into the melting chamber of a regenerative furnace. The jets are associated with firing ports and are used to increase the air flow from the regenerator into the melting chamber through selected firing ports.

U.S. Pat. No. 3,165,301 to Riviere teaches the use of fuel-oil injectors in the roof of an industrial furnace to protect its exposed refractory surfaces. The injectors produce a flow of carbon particles in a gaseous suspension along the roof of the furnace chamber in a direction opposite to a flame formed by a burner along the hearth portion of the furnace chamber. The carbon particles protect the roof refractory against the degradating effect of the heat radiating from the flame of the burner and the melted charge material.

U.S. Pat. Nos. 3,734,701 and 3,837,832 to Pecoraro et al teach the use of a burner in the refiner zone of a glass processing furnace to avoid tridymite-frost stone defects in float glass. The burners keep alkali vapors formed by the molten glass from contacting the silica crown of the furnace. It is preferred that the gas introduced at the refiner by the burner be hot, preferably within 50° F. of the temperature of the glass in the furnace.

SUMMARY OF THE INVENTION

An object of this invention is to reduce the corrosion of the lid of a glass batch heating vessel by minimizing the contact between corrosive exhaust gas in the vessel and the lid. During the melting process, corrosive vapors and particulates formed by the batch material combine with the hot exhaust gas that circulates within the heating vessel. The present invention uses at least one gas jet to inject a high velocity gas stream along selected portions of the inner surface of the lid to reduce contact between these portions and the exhaust gas. During the melting process, the velocity and flow rates of the gas stream can be adjusted and the nozzles on the jet are readily changeable so that the proper nozzle configuration can be used to effectively protect the lid during the melting process.

DETAILED DESCRIPTION OF THE INVENTION

This invention is preferably used in a batch liquefaction process but can be used in any melting process in which highly corrosive materials in an exhaust stream adversely affect a high temperature melting vessel.

In a batch liquefaction process, batch is deposited in a liquefaction vessel which, in the preferred embodiment, is adapted to apply intense heat to the batch in a relatively small space to rapidly convert the batch to a liquefied state. The liquefied batch flows out of the vessel into a connecting vessel. In a two-stage liquefaction process, waste heat from the liquefaction vessel is used to preheat batch material prior to its transfer into the liquefaction vessel. The two-stage process separates the batch liquefaction operation into a preliquefaction stage and a liquefaction stage and provides each stage with conditions that maximize the efficiency of each stage. The batch liquefying arrangement taught in U.S. Pat. No. 4,519,814 to Demarest, Jr. which teachings are hereby incorporated by reference illustrates a preferred two-stage liquefaction configuration.

Figure 1:
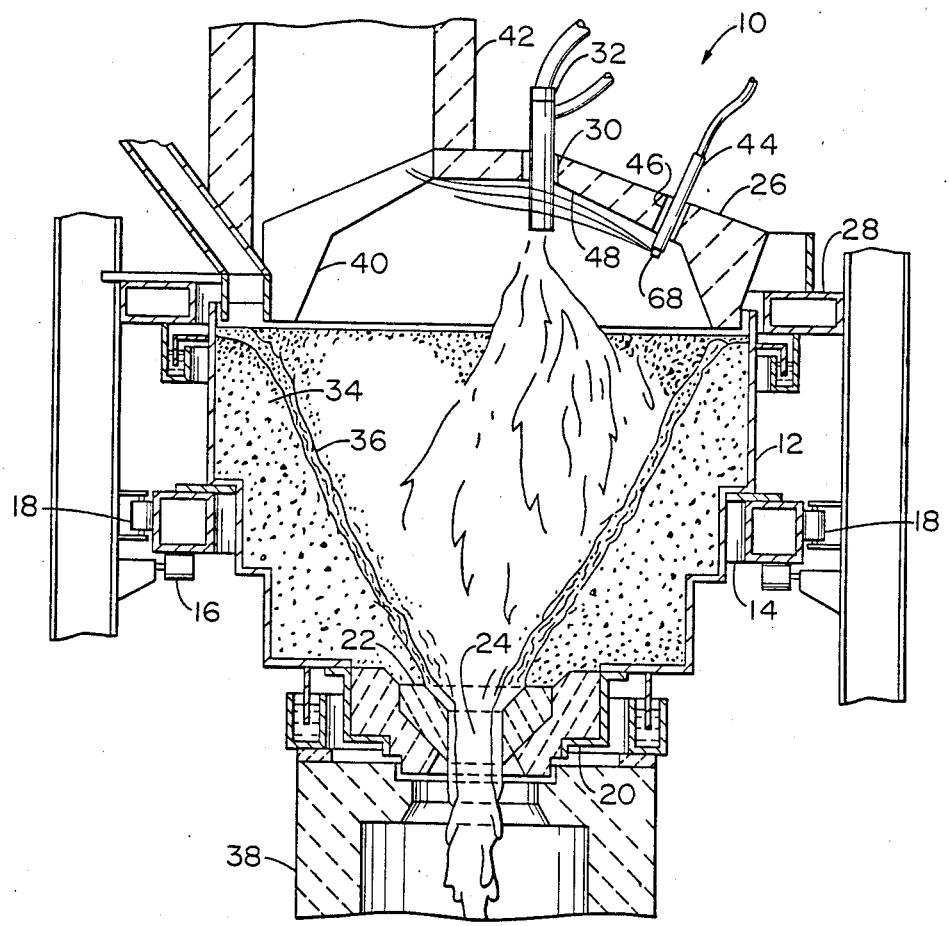
FIG. 1 is a cross-section of a liquefaction vessel with a gas jet in accordance with the preferred embodiment of the present invention.

FIG. 1 illustrates a liquefaction vessel 10 of the type disclosed in U.S. Pat. No. 4,496,387 to Heithoff et al., which teachings are hereby incorporated by reference. A steel drum 12 is supported on a circular frame 14 which is, in turn, mounted for rotation about a generally vertical axis corresponding to the centerline of the drum 12, on a plurality of support rollers 16 and aligning rollers 18. An outlet assembly 20 below the drum 12, includes a bushing 22 with an open center 24. Lid 26 is provided with stationary support by way of a circular frame 28. The lid 26 includes at least one opening 30 for inserting a high temperature burner 32. In the preferred embodiment, the lid 26 includes openings for a plurality of burners 32 and is composed of a ceramic refractory material, but the lid may be any high temperature resistant material, e.g., high temperature resistant steel.

Within the liquefaction vessel 10, a stable layer of unmelted batch 34 is maintained on the walls of the drum 12 encircling the central cavity within which combustion takes place as shown in FIG. 1. The heat from the burners 32 causes a surface portion 36 of the batch to become liquefied and flow downwardly through the bottom opening 24. The liquefied batch then flows out of the liquefaction vessel 10 and may be collected in a vessel 38 below the liquefaction vessel 10 for further processing as needed.

Exhaust gases escape upwardly through an opening 40 in the lid 26 and into an exhaust outlet 42. In a two-stage liquefaction process, the outlet 42 may provide the connection between a rotary kiln and a liquefaction vessel for preheated pulverulent material and the exhaust gas as taught in U.S. Pat. No. 4,519,814.

During the melting process in the liquefaction vessel 10, various materials become entrained in the hot exhaust gas stream. For example, in a typical soda-lime-silica glass batch, these entrained materials may include vapors such as, but not limited to, sodium oxide and particulates such as, but not limited to, sodium sulfate and sodium carbonate all of which are highly corrosive. These vapors and particulates combine with the hot exhaust gas to form a corrosive gas stream that will corrode the lid 26. The high temperature in the liquefaction vessel 10 helps accelerate the corrosion.

To reduce the corrosive effects of this high temperature corrosive exhaust gas, a gas jet 44 is positioned, for example, in opening 46 of the lid 26 as shown in FIG. 1. The jet 44 directs a high velocity stream of gas toward the opening 40 of the lid 26 which protects the lid 26 in several ways. The stream velocity is sufficient to "sweep" selected portions of the inner surface 48 of the lid 26 to remove corrosive materials that may corrode the lid surface 48. The sweeping action also minimizes contact between the lid 26 and the corrosive exhaust. In addition, it reduces recirculating tendencies within vessel 10 that tend to direct the corrosive exhaust gases repeatedly past the lid 26 and/or accumulate the exhaust at the lid 26. Furthermore, the jet gas stream is directed towards opening 40 in the lid 26, and into the exhaust outlet 42. As it exits the vessel 10, it creates a low pressure area that draws the corrosive exhaust with it. As a result, the corrosive exhaust exits the vessel 10 without first passing over the lid surface 48. The gas stream is preferably unheated which further helps reduce the temperature in the vicinity of the surface 48 thus reducing the corrosive effects of the exhaust. Although not limited by the present invention, for the same of economy the high velocity gas stream of the jet 44 is preferably compressed air.

Figure 2:
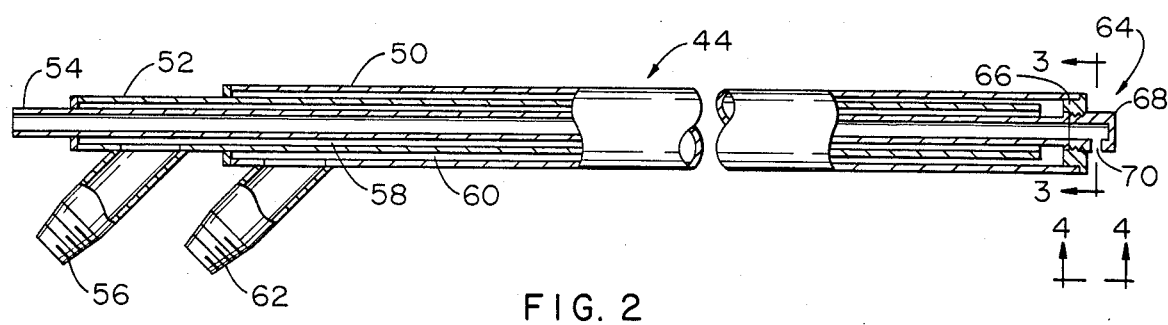
FIG. 2 is a cross-sectional view of a preferred embodiment of the gas jet.

Referring now to FIG. 2, in the preferred embodiment, the jet 44 is preferably cooled in any convenient manner such as by water but it is understood that the cooling mechanism does not affect the use of the jet 44 as taught in this invention. Three concentric pipes 50, 52 and 54 form the jet 44 with sections 50 and 52 forming the cooling jacket. Cooling fluid enters the inlet 56 and passes along annular chamber 58 between pipe sections 52 and 54. The fluid returns via annular chamber 60 between pipe sections 50 and 52 and exits through outlet 62. In the preferred embodiment, tip section 64 of the jet 44 includes an internally threaded collar 66 for easy installation and removal of threaded nozzles 68.

Figure 3:
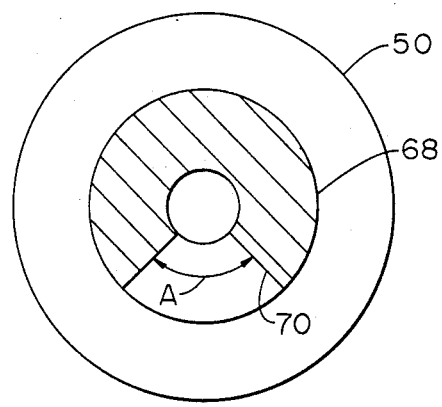
FIG. 3 is an enlarged view through line 3—3 of FIG. 2 showing the preferred nozzle arrangement of the jet.

In the preferred embodiment, as shown in FIG. 1, the jet 44 is positioned approximately normal to the adjacent lid surface. When the lid 26 is domed as in FIG. 1, the jet 44 may be tilted slightly to more effectively direct the gas stream upward or downward along the lid 26. Referring to FIG. 3, the nozzle 68 includes a slot 70 on its side so that the high velocity gas stream can be directed transversely to the longitudinal axis of the jet 44, across the surface 48 of the lid 26. It should be appreciated that the jet 44 can be placed anywhere in the vessel 10 with an appropriate nozzle configuration so as to sweep the surface 48 of the lid 26 with the high velocity gas stream. Due to the high temperature environment of the jet 44, pipe sections 50, 52 and 54 are preferably stainless steel and nozzle 68 is preferably nickel.

Figure 4:
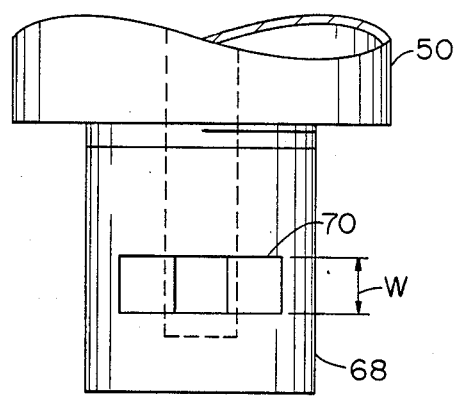
FIG. 4 is an enlarged side elevation view along line 4—4 of FIG. 2 showing the preferred nozzle arrangement of the jet.

To optimize efficiency, the jet 44 preferably provides (a) a concentrated high velocity gas stream to buffer the lid 26 against the corrosive gas and redirect its circulation towards the exhaust outlet 42, (b) at a low volume flow rate so as to minimize adding to the gas volume passed to a heat recovery system that may be associated with the liquefaction vessel 10. Side discharge nozzles 68, as shown in FIGS. 3 and 4, with varying slot widths W and spread angles A may be provided. Nozzles having larger spread angles provide wider coverage. The actual flow rate and nozzle configuration required for a process is empirical and varies based on the type of process, the total system throughput, firing rate, nozzle size opening, gas pressure and gas jet flow velocity, but is expected that the flow rate of the jet 44 need not be more than 5% of the flow rate of the exhaust stream and preferably less than 2% in order to attain adequate levels of lid 46 protection. Changing nozzles 96 to achieve desirable results is expedited by the threaded attachment arrangement at the tip 64 of the jet 44. Furthermore, the jet flow velocity at the nozzle orifice is preferably at least an order of magnitude greater than the adjacent velocity of the exhaust gas. Flow rates can be controlled by a metering and valve arrangement (not shown) connecting the jet 44 to a compressed gas source (not shown) in a manner well known in the art. The flow rate from the jet 44 can be monitored and automatically controlled based on variations in the firing rate and associated volume of exhaust gas in the liquefaction vessel 10.

It should be appreciated that multiple gas jets may be used in the lid 44, positioned to reduce lid corrosion at diverse regions.

Although the present invention has been disclosed in conjunction with the glass liquefaction process, the invention may have applicability in other heating process where highly corrosive exhaust gases pose similar problems.

The form of the invention shown and described herein represents an illustrative embodiment and it is understood that various changes can be made without departing from the scope of the invention.

I claim:

1. In an apparatus for melting material of the type having a heating vessel with a lid, a high velocity combustion type heating means for heating said material within said vessel, and means to remove exhaust resulting from said heating means from said vessel, wherein the exhaust gas includes entrained particulates and gases resulting from the melting of said material having corrosive properties which degrade selected exposed portions of said lid as the exhaust circulates within said vessel prior to exiting said vessel, the improvement comprising:
   means to inject a high velocity gas flow adjacent said selected lid portions to minimize contact of said circulating exhaust with said selected exposed lid portions of said vessel.

2. The apparatus as in claim 1 wherein said injecting means includes at least one gas jet with a nozzle member positioned and oriented relative to said selected lid portions to direct said high velocity gas flow in a predetermined direction so as to minimize contact between said selected lid portions of said vessel and said exhaust, and to direct said exhaust towards said exhaust removing means.

3. The apparatus as in claim 2 wherein said vessel is a glass batch liquefaction vessel.

4. The apparatus as in claim 3 wherein said exhaust removing means includes an exhaust outlet in said lid.

5. The apparatus as in claim 4 wherein said nozzle of said gas jet is adapted to be movable relative to said selected lid portions of said vessel.

6. The apparatus as in claim 2 further including means to adjust the velocity and flow rate of said high velocity gas flow.

7. The apparatus as in claim 6 wherein the flow rate of said gas flow is no more than 5% of the flow rate of said exhaust.

8. The apparatus as in claim 2 wherein said high velocity gas flow is discharged from said nozzle approximately normal to said jet.

9. The apparatus as in claim 8 wherein said nozzle includes a slot for discharge of said high velocity gas flow with a predetermined slot size and spread angle.

10. The apparatus as in claim 9 further including means to adjust said slot size and spread angle.

11. The apparatus as in claim 2 wherein said high velocity gas flow is compressed air.

12. The apparatus as in claim 11 wherein said jet is encased in a cooling jacket.

13. The apparatus as in claim 12 wherein said jet is water cooled.

14. In a method of liquefying pulverulent batch material including the steps of depositing said material into a heating vessel, raising the temperature within the vessel with a high velocity combustion type heating means to liquefy said material, and removing hot exhaust gas resulting from said heating means out from said heating vessel wherein said exhaust gas includes entrained particulates and gases resulting from liquefying said batch material having corrosive properties which degrades selected exposed lid portions of said vessel as said exhaust gas circulates within said vessel prior to exiting said vessel, the improvement comprising:
   injecting a high velocity gas flow between said corrosive exhaust gas and said selected lid portions at a predetermined rate to minimize contact between said selected lid portions of said vessel and said circulating corrosive exhaust gas.

15. The method as in claim 14 wherein said injecting step further includes injecting said gas flow at a flow rate sufficient to reduce circulation of said exhaust in the vicinity of said selected lid portions.

16. The method as in claim 15 further including the step of varying said flow rate.

17. The method as in claim 14 further including the step of directing said gas flow towards an exhaust outlet in said heating vessel.

* * * * *